US010401636B2

(12) United States Patent
Keane et al.

(10) Patent No.: US 10,401,636 B2
(45) Date of Patent: Sep. 3, 2019

(54) VOLUMETRIC 3D DISPLAY

(71) Applicant: Voxon, Co, San Francisco, CA (US)

(72) Inventors: Sean Frederick Keane, San Francisco, CA (US); Alan Jackson, San Francisco, CA (US); Gavin Finlay Smith, San Francisco, CA (US); William Joseph Tamblyn, San Francisco, CA (US); Ken Silverman, San Francisco, CA (US)

(73) Assignee: Voxon, Co, San Francisco, CA (US)

( * ) Notice: Subject to any disclaimer, the term of this patent is extended or adjusted under 35 U.S.C. 154(b) by 14 days.

(21) Appl. No.: 15/533,541

(22) PCT Filed: Dec. 8, 2015

(86) PCT No.: PCT/IB2015/059432
§ 371 (c)(1),
(2) Date: Jun. 6, 2017

(87) PCT Pub. No.: WO2016/092464
PCT Pub. Date: Jun. 16, 2016

(65) Prior Publication Data
US 2017/0371172 A1 Dec. 28, 2017

Related U.S. Application Data

(60) Provisional application No. 62/089,064, filed on Dec. 8, 2014.

(51) Int. Cl.
*G02B 27/22* (2018.01)
*G03B 21/56* (2006.01)
(Continued)

(52) U.S. Cl.
CPC ......... *G02B 27/2278* (2013.01); *G02B 27/22* (2013.01); *G02B 27/2285* (2013.01);
(Continued)

(58) Field of Classification Search
CPC .................................................. G03B 21/562
(Continued)

(56) References Cited

U.S. PATENT DOCUMENTS 3,024,374 A 3/1962 Stauder
3,371,155 A 2/1968 Andersen
(Continued)

FOREIGN PATENT DOCUMENTS

DE 10043272 A1 4/2002
WO 2014165863 A2 10/2014

*Primary Examiner* — Christopher E Mahoney
(74) *Attorney, Agent, or Firm* — The Webb Law Firm

(57) ABSTRACT

A drive system for a projection screen in a swept surface volumetric 3D display is disclosed. The drive system causes the projection screen to reciprocate through an excursion distance at a screen reciprocating frequency relative to a projection system. The drive system includes an actuator arrangement for generating an input reciprocating force substantially at the screen reciprocating frequency through an input excursion distance and a support structure for the projection screen. The support structure includes a resonant mounting arrangement for the projection screen. The resonant mounting arrangement is operably connected to the actuator arrangement and configured to allow the projection screen to reciprocate through the excursion distance. The resonant mounting arrangement is configured to have a resonant frequency substantially equivalent to the screen reciprocating frequency on actuation of the actuator arrangement. A gaming console incorporating a swept surface volumetric 3D display based on the drive system is also disclosed.

23 Claims, 13 Drawing Sheets

(51) Int. Cl.
  *H04N 13/393* (2018.01)
  *G03B 35/24* (2006.01)
(52) U.S. Cl.
  CPC ......... *G03B 21/562* (2013.01); *H04N 13/393* (2018.05); *G03B 35/24* (2013.01)
(58) Field of Classification Search
  USPC .................................................. 359/446, 458
  See application file for complete search history.

(56) References Cited

U.S. PATENT DOCUMENTS

| | | | |
|---|---|---|---|
| 4,130,832 A * | 12/1978 | Sher | G02B 27/2285 345/31 |
| 5,444,479 A | 8/1995 | Fernekes et al. | |
| 5,954,414 A | 9/1999 | Tsao | |
| 6,302,542 B1 | 10/2001 | Tsao | |
| 6,853,734 B2 | 2/2005 | Sahyoun | |
| 7,449,803 B2 | 11/2008 | Sahyoun | |
| 7,593,159 B2 * | 9/2009 | Yokoyama | G02B 27/48 359/446 |
| 8,018,294 B2 | 9/2011 | Watanabe | |
| 2002/0163482 A1 * | 11/2002 | Sullivan | G02B 27/2278 345/6 |
| 2009/0009860 A1 * | 1/2009 | Marshall | G03B 21/56 359/446 |
| 2011/0037836 A1 | 2/2011 | Chang | |
| 2013/0010356 A1 * | 1/2013 | Curtis | G02B 27/48 359/444 |
| 2015/0296280 A1 * | 10/2015 | Lee | B06B 3/00 381/412 |
| 2016/0103388 A1 * | 4/2016 | Herati | G03B 21/562 359/446 |
| 2016/0209669 A1 * | 7/2016 | Digel | G02B 27/48 |
| 2016/0327804 A1 * | 11/2016 | Basler | G02B 27/48 |

* cited by examiner

VOLUMETRIC 3D DISPLAY

CROSS-REFERENCE TO RELATED APPLICATIONS

This application is the United States national phase of International Application No. PCT/IB2015/059432 filed Dec. 8, 2015, and claims priority to U.S. Provisional Patent Application No. 62/089,064 filed Dec. 8, 2014, the disclosures of which are hereby incorporated in their entirety by reference.

INCORPORATION BY REFERENCE

The following publications are referred to in the present application and their contents are hereby incorporated by reference in their entirety:

International Patent Application No. PCT/US2014/033233 (WO 2014/165863) titled "A SYSTEM FOR CAPTURING TRANSMITTING, AND DISPLAYING VOLUMETRIC DATA", filed 7 Apr. 2014 and claiming priority from U.S. Provisional Application No. 61/808,867;

U.S. Pat. No. 6,853,734, to Sahyoun, titled "Audio Speaker Damper with Electrically Conductive Paths Thereon to Carry Voice Coil Signals and a Method Therefore", and filed 19 May 2003;

U.S. Pat. No. 7,449,803, to Sahyoun, titled "Electromagnetic Motor to Create a Desired Low Frequency Vibration or to Cancel an Undesired Low Frequency Vibration", and filed 21 Mar. 2005; and U.S. Pat. No. 3,024,374, to Stauder, titled "Linear Rate Generator", and filed 7 Oct. 1957.

TECHNICAL FIELD

The present disclosure relates to a volumetric three dimensional (3D) display for the display of volumetric data. In a particular form, the present disclosure relates to the drive system for the projection screen of the volumetric 3D display.

BACKGROUND

In our earlier PCT Application No PCT/US2014/033233 titled "A SYSTEM FOR CAPTURING TRANSMITTING, AND DISPLAYING VOLUMETRIC DATA", here incorporated by reference in its entirety, a volumetric 3D display was described. This display was based on a reciprocating swept volume arrangement including a reciprocating screen and a rear projection system. As noted in this PCT application, the reciprocation frequency required for such a system is of the order of 20 Hz or preferably higher in order to reduce the apparent flicker to a level suitable for general display and interactive gameplay.

For a large volume display, this implies that the screen must travel through distances or excursions of around 10 cm on the order of 20 times per second. These requirements can place large physical stresses on the drive system for the screen. Furthermore there is the need to ensure that the screen position is synchronized to the projector to ensure that the correct two dimensional (2D) image or slice is being projected for that particular screen position.

There is thus a need to provide a drive system for a volumetric 3D display capable of driving a screen at elevated excursion frequencies to reduce apparent flicker in the 3D display.

SUMMARY

In a first aspect the present disclosure provides a drive system for a projection screen in a swept surface volumetric three dimensional (3D) display, the drive system operable to cause the projection screen to reciprocate through an excursion distance at a screen reciprocating frequency relative to a projection system, the drive system including:

an actuator arrangement for generating an input reciprocating force substantially at the screen reciprocating frequency through an input excursion distance; and a support structure for the projection screen, the support structure including a resonant mounting arrangement for the projection screen, the resonant mounting arrangement operably connected to the actuator arrangement and configured to allow the projection screen to reciprocate through the excursion distance, wherein the resonant mounting arrangement is configured to have a resonant frequency substantially equivalent to the screen reciprocating frequency on actuation of the actuator arrangement.

In another form, the support structure for the projection screen includes a first support component for supporting the projection screen and a second support component to mount the resonant mounting arrangement to for attachment to the first support component.

In another form, the second support component is directly connected to the actuator arrangement to in turn drive the resonant mounting arrangement to drive the first support component and the projection screen to reciprocate at the screen reciprocating frequency.

In another form, the actuator arrangement includes a single actuator and wherein the second support component is connected to the single actuator.

In another form, the actuator arrangement includes multiple actuators and wherein the second support component is connected to the multiple actuators.

In another form, the second support component includes a frame member that substantially surrounds the first support component, and wherein the resonant support arrangement includes one or more resilient members mounted to and extending from the frame member and attached to the first support component.

In another form, the first and second support components are in a stacked configuration, and wherein the resonant support arrangement includes one or more resilient members mounted to and extending from the second support component and attached to the first support component.

In another form, the second support component is stationary with respect to the actuator arrangement and the actuator arrangement directly drives the resonant mounting arrangement to drive the first support component and the projection screen to reciprocate at the screen reciprocating frequency.

In another form, the second support component includes a frame member that substantially surrounds the first support component, and wherein the resonant mounting arrangement includes one or more mounting members mounted to and extending from the frame member and attached to the first support component.

In another form, the one or more mounting members include a resilient portion.

In another form, one or more mounting members further include a non-extendible portion, and wherein the actuator arrangement directly drives the non-extendible portion with respect to the second support component to in turn drive the resilient portion.

In another form, the actuator arrangement includes a plurality of actuators each driving a respective mounting member.

In another form, a magnification factor defined by a ratio of the excursion distance of the projection screen to the input excursion distance of the actuator arrangement is greater than or equal to 10.

In another form, the magnification factor is greater than or equal to 15.

In another form, the magnification factor is greater than or equal to 20.

In another form, the reciprocation frequency of the projection screen is about 20 Hz.

In another form, the resonant mounting arrangement is tunable to vary the resonance frequency.

In another form, the actuator arrangement is based on one or more linear actuators.

In another form, the one or more linear actuators are one or more electromagnetic coils.

In another form, the one or more electromagnetic coils are subwoofers.

In another form, the one or more electromagnetic coils are bass shakers.

In a second aspect the present disclosure provides a swept surface volumetric 3D display incorporating a drive system according to the first aspect of the disclosure.

In a third aspect the present disclosure provides a gaming console incorporating the swept surface volumetric 3D display of the second aspect of the disclosure.

BRIEF DESCRIPTION OF DRAWINGS

Embodiments of the present disclosure will be discussed with reference to the accompanying drawings wherein.

In the following description, like reference characters designate like or corresponding parts throughout the figures.

DESCRIPTION OF EMBODIMENTS

Figure 1:
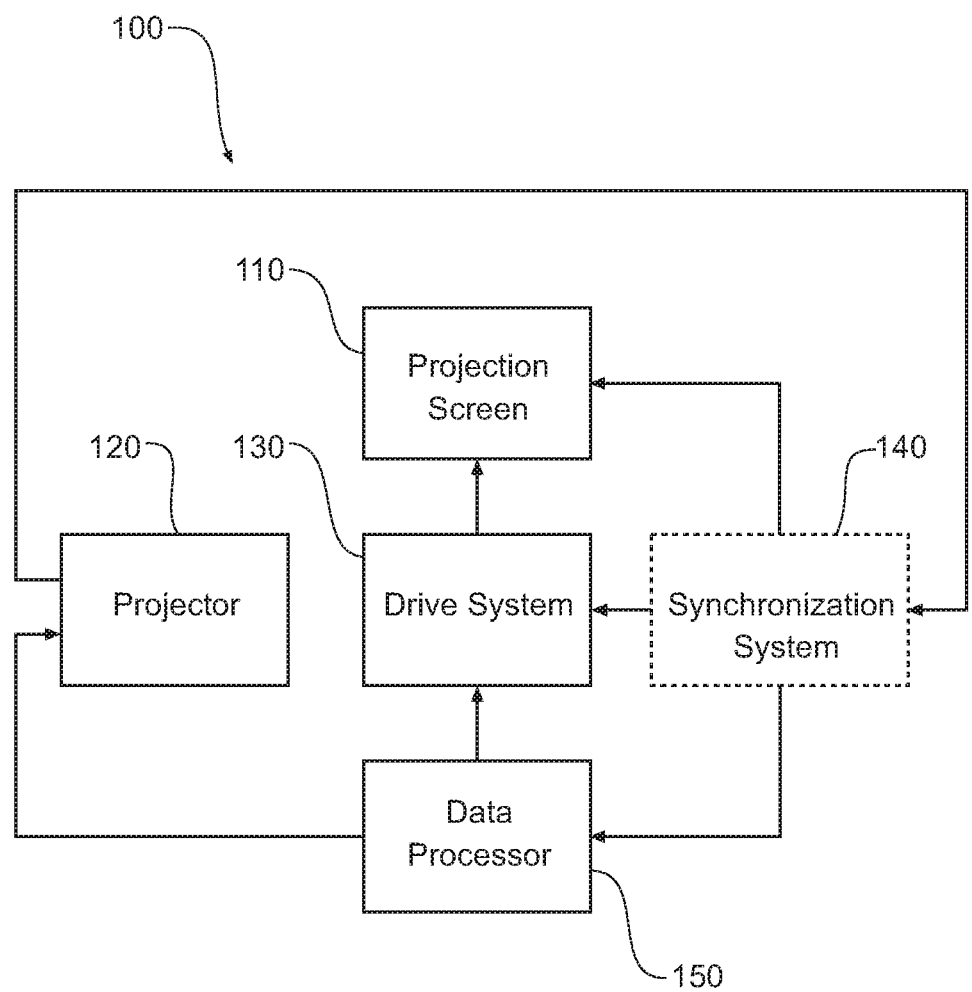
FIG. 1 is a system block diagram of a volumetric 3D display in accordance with an illustrative embodiment.

Referring now to FIG. 1, there is shown a system block diagram depicting the various sub-systems of a volumetric 3D display 100 according to an illustrative embodiment. Volumetric 3D display in this example includes data processor 150, projector 120, drive system 130 and projection screen 110 and optional synchronization system 140. The interaction of these subsystems will now be described in detail below.

Projection screen 110 is caused to reciprocate through an excursion distance at a screen reciprocating frequency relative to projector 120 by drive system 130. As the position of the projection screen is known, the relevant 2D image or "slice" corresponding to that position may be projected onto the projection screen at this time. As the projection screen traverses the swept volume defined by the maximum excursion distance of the projection screen, a 3D composite image is formed by persistence of vision which "adds" each 2D slice together.

Data processor 150, which in one embodiment is in the form of a standard personal computer (PC) or alternatively may be implemented as a custom electronics board, functions to provide projector 120 with the relevant 2D images at the correct timing. Data processor 150 maintains a 3D coordinate array of image data spanning the length (X), breadth (Y) and height (Z) of the physical swept volume at a particular instant. Data specifying the pixel values for an element of the 3D coordinate array for a given time is received into data processor 150 as an input from either a program running on data processor 150 (eg, game program) or from an external source. This input 3D data is then processed and updated in real time to the 3D coordinate array which forms the basis of the display information sent to projector 120. Further description of these projection aspects of a volumetric 3D display may be found in our earlier PCT Application No. PCT/US2014/033233 titled "A SYSTEM FOR CAPTURING TRANSMITTING, AND DISPLAYING VOLUMETRIC DATA", here incorporated by reference in its entirety.

In this illustrative embodiment, synchronization system 140, comprising its own microprocessor, determines when a complete volume has been processed by the projector. For every batch of 24 slices being projected, a signal is sent by the projector to the microprocessor. The microprocessor receives this signal, and after a predetermined number of batches as calculated from the desired reciprocating frequency, sends a signal to data processor 150 that the entire swept volume has been displayed by projector 120 implying that projection screen 110 is about to commence a cycle.

Synchronization system 140 in this embodiment also functions to generate a wave form which is used to control the drive system 130. One advantage of this method is that the signal that controls the drive system 130 and the projection system 120 may operate independently from any other data processing. Another advantage is that any audio output from data processor 150 (such a PC audio speaker) may be employed for game or application related audio (see below) instead of providing an audio drive signal to drive system 130.

From this synchronization signal, data processor 150 resets an internal counter to indicate that the 2D cross sectional image or slice to be sent to projector should correspond to the 2D image associated with the bottom most plane of the 3D coordinate array of image data. Respective images of increasing Z position or height are then sent to projector 120 at a predetermined rate so that when the projection screen has reached the top of its reciprocation cycle the final 2D cross sectional image corresponding to the maximum height of the swept volume is sent to projector 120 for display. As would be appreciated, in another embodiment respective 2D images may also be interlaced on the "up" and "down" stroke of the reciprocating projection screen 110.

In another embodiment, no separate synchronization system 140 is employed and data processor 150 includes an audio output and an output waveform is generated from the data processor for output by the audio output to directly drive the drive system 130. In other embodiments, the projector 120 and data processor 150 may be combined into a single unit.

One of the most important factors in determining the quality of the 3D image is the reciprocating frequency of the projection screen. For a constant excursion distance, an increased reciprocating frequency allows the swept volume to be traversed more rapidly and hence more information may be projected per unit time. A reciprocating frequency of or about 20 Hz has been found to be suitable for most applications. In one embodiment, data processor 150 sends 2D images to projector 120 at a frame rate of 2880 frames per second. For a 20 Hz reciprocating frequency this then corresponds to 144 frames for one cycle or 72 frames for a single traversal of the swept volume.

Figure 2:
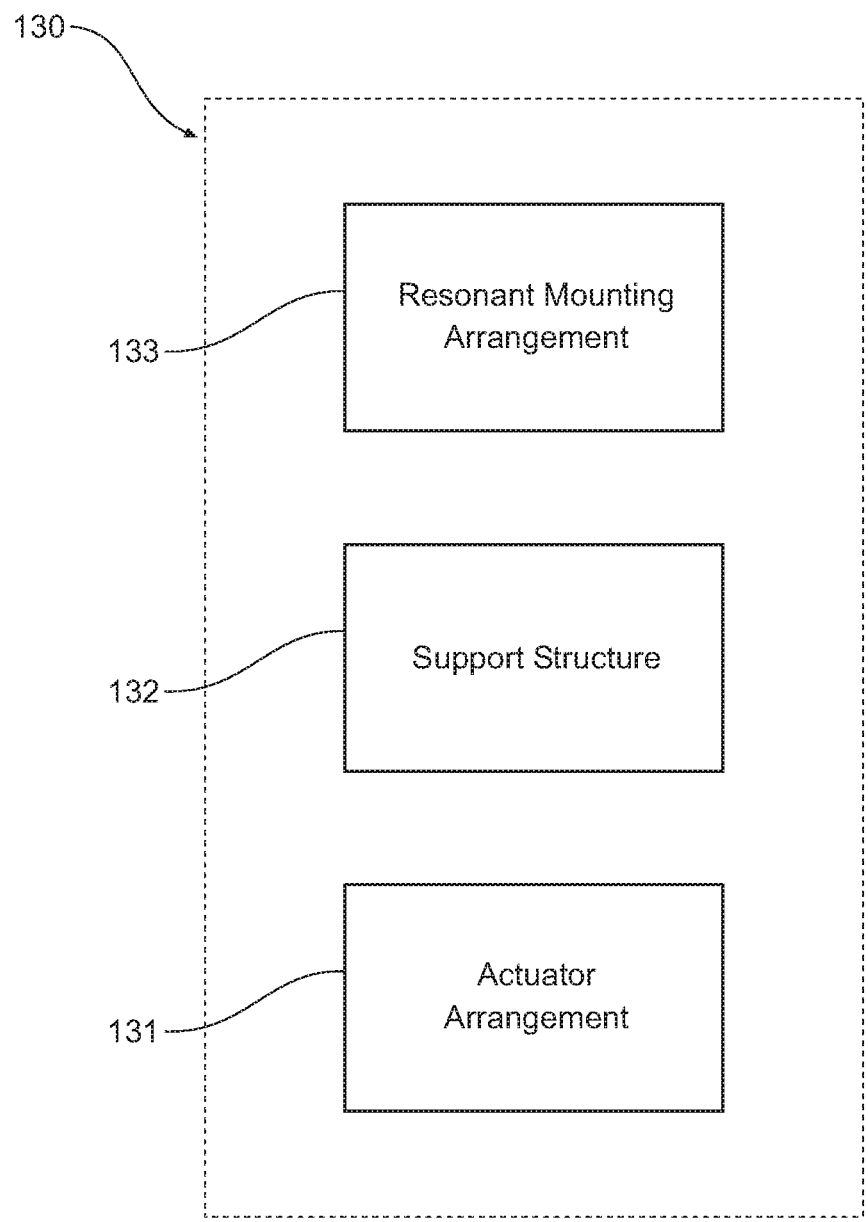
FIG. 2 is a system block diagram of the drive system sub-system for the projection screen of the volumetric 3D display illustrated in FIG. 1.

Drive system 130 functions to cause the projection screen 110 to reciprocate at the reciprocating frequency. Referring now to FIG. 2, there is shown a system block diagram of the drive system 130 subsystem according to an illustrative embodiment. In this example, drive system 130 includes an actuator arrangement 131, a support structure 132 for the projection screen 110 that allows the projection screen to reciprocate through the excursion distance and a resonant mounting arrangement 133. Actuator arrangement 131 generates an input reciprocating force at an input frequency whose energy is transferred to the projection screen 110 by the resonant mounting arrangement to cause the projection screen 110 to reciprocate. If the input frequency of the actuation arrangement 131 is matched to the resonant frequency of the resonant mounting arrangement 133 (which has been tuned to the desired reciprocating frequency) then this results in substantial amplification of the input reciprocating motion from the actuator arrangement 131.

In another embodiment, projector 120 sends a top frame count signal to sensor system 140 that indicates that the top frame corresponding to the expected top of the swept volume has been displayed. As would be appreciated, the top frame count signal is expected to be generated at the reciprocation frequency and accordingly may be used as a feedback signal to the drive system 130 to ensure that the drive system 130 is being driven at the correct frequency.

In one embodiment, actuator arrangement 131 receives the top frame count signal from synchronization system 140. In another embodiment, actuator arrangement 131 receives this signal directly from projector 120. Where actuator arrangement 131 is based on an electromagnetic coil type actuator, the top frame count signal originating from projector 120 may be used to generate an analog output waveform which forms the input to an amplifier, which in turn drives the electromagnetic coil at the correct reciprocation frequency.

Figure 3:
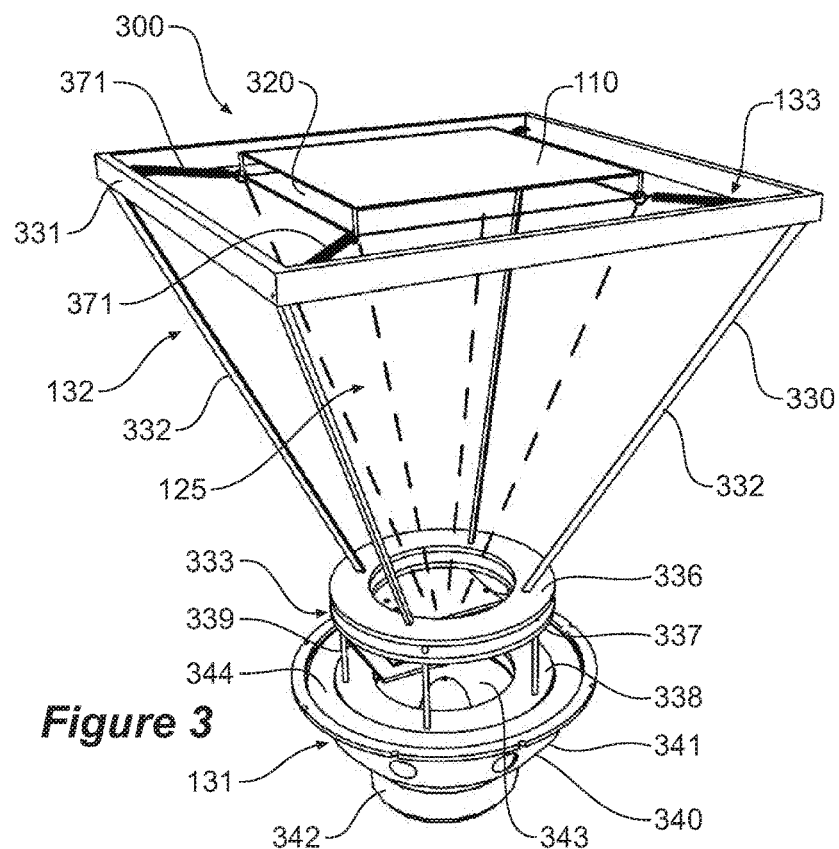
FIG. 3 is a perspective view of a drive system for a projection screen for a volumetric 3D display in accordance with an illustrative embodiment.
Figure 4:
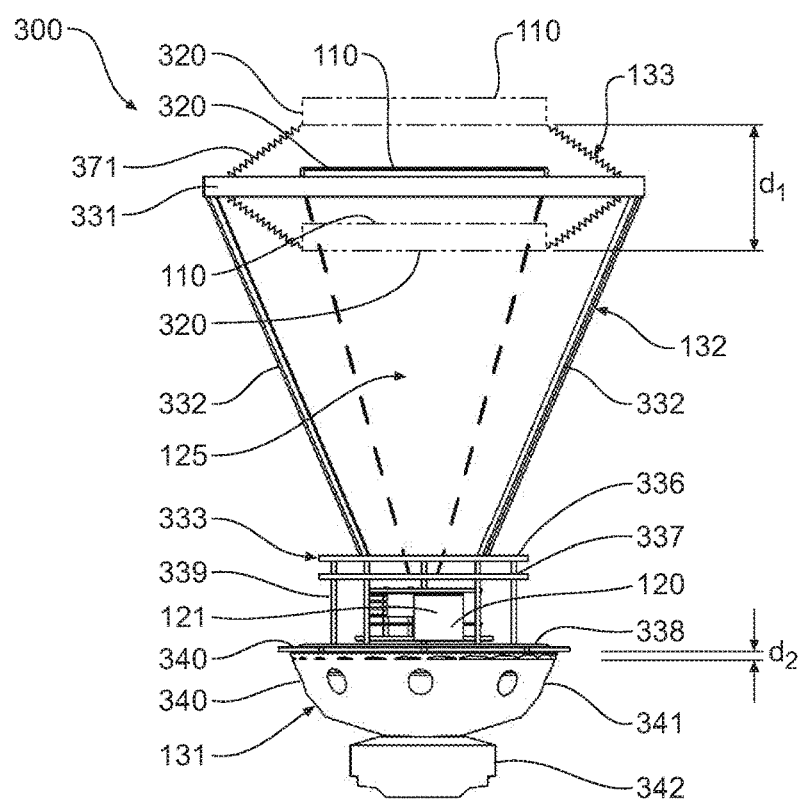
FIG. 4 is a side view of the drive system illustrated in FIG. 3.
Figure 5:
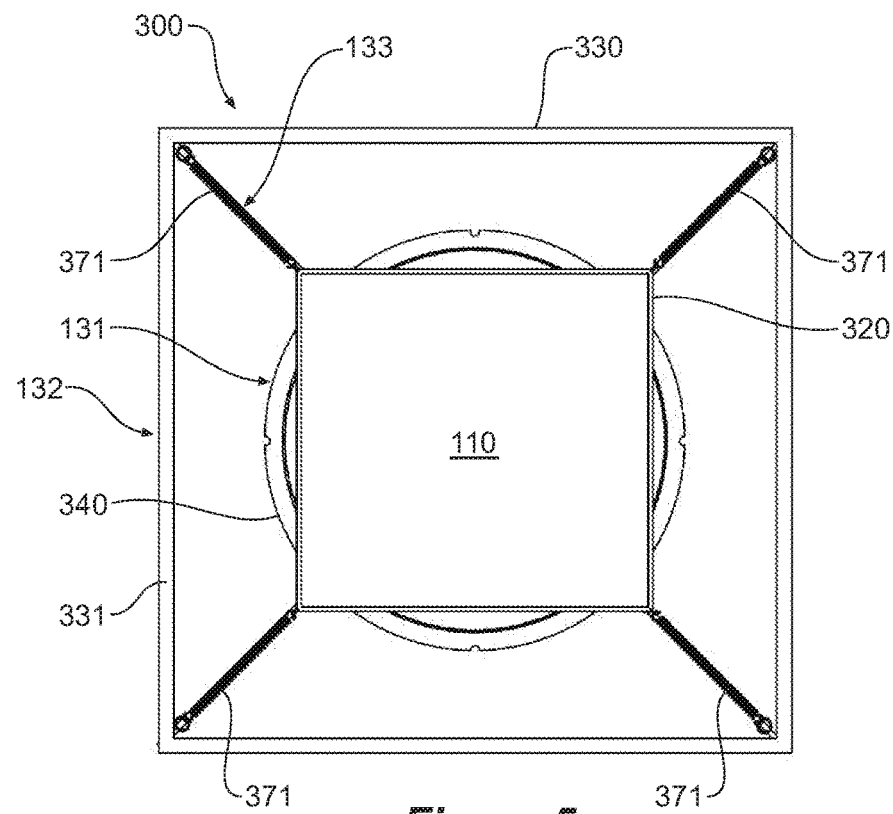
FIG. 5 is a top view of the drive system illustrated in FIG. 3.

Referring now to FIGS. 3 to 5 there are shown perspective, side and top views of a drive system 300 for a projection screen 110 according to an illustrative embodiment. Drive system 300 includes a support structure 132, resonant mounting arrangement 133 and actuator arrangement 131. In this embodiment, support structure 132 includes a first support component 320 for supporting the projection screen 110 which is formed of 3M™ Vikuiti™ rear projection display film. This material is a high contrast flexible film having a thickness of 0.3 mm (without liner) that allows high resolution and high brightness images to be displayed. The film also includes an adhesive layer which allows the projection screen to be adhered to the first support component 320 as required.

In this example, a square sheet of Vikuiti™ film having a length of 20 cm is employed. First support component 320 is formed from transparent polycarbonate material having a square lid type configuration and provides a rigid support for projection screen 110 as well as a structure that the resonant mounting arrangement 133 may attach to.

As would be apparent, projection screen 110 may be formed of other materials that have suitable display characteristics such as high contrast, translucent and substantially non-diffusing, including other proprietary rear projection materials such as Black Diamond™ Rear-Pro™ film available from Screen Innovations™. In other examples, a thin layer of styrene may be employed. In yet another example, fabrics such as spandex may also be employed. In yet other embodiments, the fabric may be air permeable and/or perforated to reduce air resistance that arises as a result of the moving projection screen 110.

Support structure 132 also includes a second support component 330 comprising an outer square frame member 331 and four struts 332 that each extend downwardly and taper inwardly to be supported by an open cylindrical structure 333 comprising three vertically spaced apart rings 336, 337, 338 joined by four vertically extending legs 339 and whose central circular opening provides an aperture through which the 2D images are projected by projector 120 and whose bottom end is seated on the actuator arrangement 131.

In this embodiment, the actuator arrangement 131 is an electromagnetic coil device which in this example is a 12 inch subwoofer 340 having a maximum excursion of 30 mm Subwoofer 340 is of a conventional design having an outer frame or basket 341 attached to the electromagnetic coil driver 342 which includes a permanent magnet and pole component (not shown) and an inner cone or diaphragm 343 that seats within basket 341. Cone 343 has attached to its base an electromagnetic coil (not shown) which seats within the electromagnetic coil driver and which will be caused to reciprocate vertically within basket 341 through an input excursion distance $d_2$ (as best shown in FIG. 4) in accordance with currents applied to the electromagnetic coil.

As best seen in FIG. 3, the bottom ring 338 of support structure 132 is seated on top of the cone 343 of subwoofer 340. Accordingly, when subwoofer 340 is actuated to cause the cone 343 to reciprocate vertically, this will cause the entire support structure 132 to reciprocate at the same frequency that cone 343 reciprocates or vibrates.

Support structure 132 further includes a resonant mounting arrangement 133 for projection screen 110. In this embodiment, resonant mounting arrangement 133 includes four resilient members 371 each attached at one end to the corners of first support component 320 which supports projection screen 110 and which extend outwardly to be mounted to the corners of square frame member 331 of second support component 330. In this manner, projection screen 110 is able to reciprocate vertically through the required excursion distance $d_1$ above and below frame member 331 due to the extendibility of resilient members 371 (as best seen in FIG. 4). In this illustrative embodiment, resilient members 371 are springs formed of spring steel having a gauge of 1.5 mm, a diameter of 15 mm and a length of 65 mm when fully compressed, but equally other arrangements may be used such as the use of resilient bands formed of rubber or appropriate synthetic material. As would also be appreciated, the number of individual resilient members and their positioning may be varied to obtain the desired resonance frequency.

In another embodiment, resilient member 371 may be in the form of a radial flexure member extending from frame member 331 to first support component 320. Radial flexures that may be adapted in this manner are disclosed in U.S. Pat. No. 6,853,734, to Sahyoun, and titled "Audio Speaker Damper with Electrically Conductive Paths Thereon to Carry Voice Coil Signals and a Method Therefore", whose entire contents are incorporated here by reference.

As would be appreciated, resilient member 371 may be any arrangement that provides a restorative force dependent on the displacement of the arrangement from an equilibrium position. Some examples include, but are not limited to, magnetic arrangements based on the repelling force of same pole magnets or air or liquid hydraulic arrangements.

Projector 120 is mounted independently of support structure 132 so that it remains stationary while the cone 343 of the subwoofer 340 and the support structure 132 reciprocate. In this embodiment, projector 120 is a Texas Instruments™ DLP™ LightCrafter™ 4500 projector based on micro-mirror array technology. The LightCrafter™ 4500 projector is relatively compact having outer dimensions of 122 mm×115 mm×48 mm and capable of generating 150 L or 600 L of light output depending on the model. The projector light output is shown figuratively as light output cone 125. In this example, projector 110 is attached to a mounting plate that sits on the stationary outer rim 344 of the basket or frame 341 of subwoofer 340.

As would be appreciated, while in this embodiment projector 120 is mounted centrally within the drive system where the image is relayed upwardly to projection screen by relay mirror 121, this need not necessarily be the case as the image from the projector may be relayed by any suitable optical arrangement from a remote position. In this case, the central mounting of projector 120 advantageously reduces the footprint and is suitable for a compact system. Other types of projectors may be employed depending on the configuration requirements including projectors based on multiple DLP™ chips. In other embodiments, multiple projectors may be employed where each projector is configured to project respective 2D slices within the swept volume. In another embodiment, high-intensity discharge (HID) bulbs may be used, each HID bulb providing a monochrome source which may then be used to generate a monochromatic image or combined to provide a color image.

The principles of the drive system will now be described in more detail and in particular the operation of the resonant mounting arrangement 133. The resonant mounting arrangement 133 relies on the principle that an oscillatory system will amplify any periodic input at the relevant resonant frequency. In this case, the actuator arrangement 131 provides a periodic input in the form of cone 343 that reciprocates at the resonant frequency of the resonant mounting arrangement 133 through input excursion distance $d_2$. Energy is transferred to the resonant mounting arrangement 133 comprising resilient members 371 by second support component 330 to which resilient members are mounted to at one end and then in turn to first support component 320 upon which the projection screen 110 is supported. In this example, the input excursion distance $d_2$ of the cone 343 on actuation is approximately 5 mm while the excursion distance of projection screen 110 is approximately 100 mm when the projection screen 110 is reciprocating at the resonance frequency (ie, a magnification factor in terms of excursion distance of approximately 20).

In another embodiment, the magnification factor defined by the ratio of the excursion distance of the projection screen, $d_1$, to the input excursion distance, $d_2$, is greater than 20. In other embodiments, the magnification factor may be a range selected from, but not limited to, 5-10, 10-15, 15-20, 20-25 or 25-30.

Some factors that may assist in achieving a resonant system include having projection screen 110 and associated first support component 320 formed by materials that are relatively light and rigid. Increased mass in any vibrating body will result in increased momentum and forces which will require stronger support structures to reduce any secondary vibrations which may function to reduce the ability to achieve a resonance condition. In line with this principle, an actuator that creates a powerful driving force but has minimal self-weight is likely to assist. In the above described embodiment, an electromagnetic coil in the form of a subwoofer 340 is employed where the moving or actuated elements of the subwoofer 340 include only the cone 343 and the attached coil whose combined weight is small.

Another consideration is the tension of the resilient members 371. As a general rule, to increase the resonant frequency for the resonant mounting arrangement 133 the tensile force of the resilient members 371 is also increased. Depending on the configuration, it may also be important that the second support component 330, to which the resonant mounting arrangement is mounted to is suitably rigid or stiff to ensure that the resilient members 371 are held at the correct tension.

In some circumstances, it may be necessary to modify or tune the resonant frequency to a desired reciprocating frequency for the projection screen. In one example, this may be achieved by changing the tension of the resilient members 371. In the case where resilient members 371 are springs, the spring may be attached at one end to the first support component 320 and part way extended to the frame member 331. A cable tie or other variable tensioning means may then be attached to the free end of each of the springs at one end and then attached to the respective corners of frame member 331 at the other end. The tension of the springs may then be increased by progressively shortening the cable tie on each corner until the desired resonance frequency is achieved. In another approach, resilient members 371 of increasing tension may be simply substituted into resonant mounting arrangement 133 until the desired resonance frequency is achieved.

To determine the resonant frequency of drive system 300 a variable tone generator may be employed to create a manually controllable tone at a given frequency as input to subwoofer 340. In one example procedure, a tone is initially generated at 1 Hz and slowly increased until resonance occurs. This is directly observable as the first support component 320 and projection screen 110 will reach their maximum excursion distance but with minimal movement of the support structure 132. To raise the resonance frequency of the resonant mounting arrangement, the tension of the resilient members 371 may be increased as described above. As would be appreciated, the design of the resonance mounting arrangement may be assisted through the use of computer aided design (CAD) software incorporating vibration and mechanical design capability.

Figure 6:
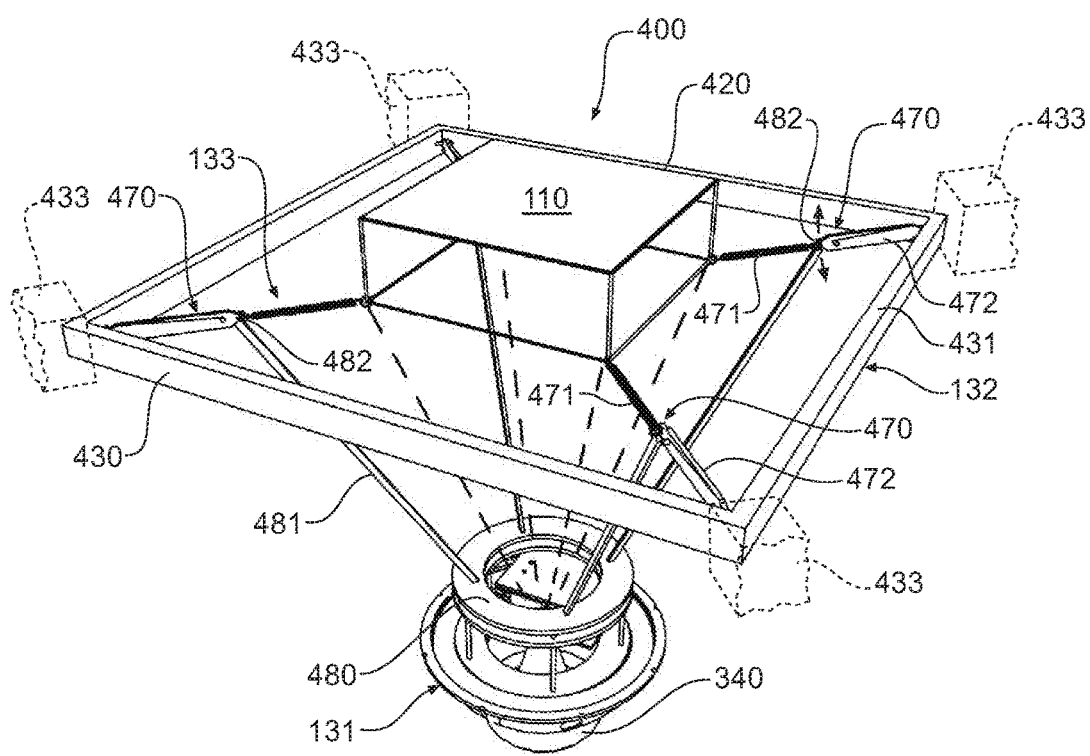
FIG. 6 is a perspective view of a drive system for a projection screen for a volumetric 3D display in accordance with another illustrative embodiment.
Figure 7:
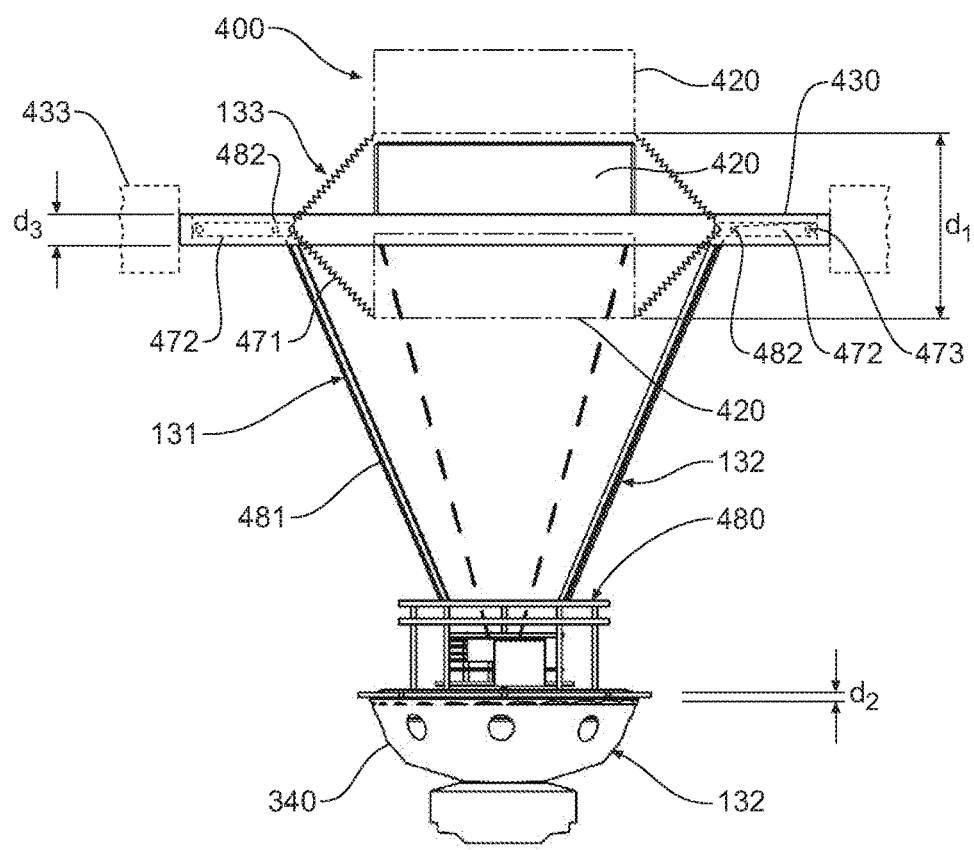
FIG. 7 is a side view of the drive system illustrated in FIG. 6.
Figure 8:
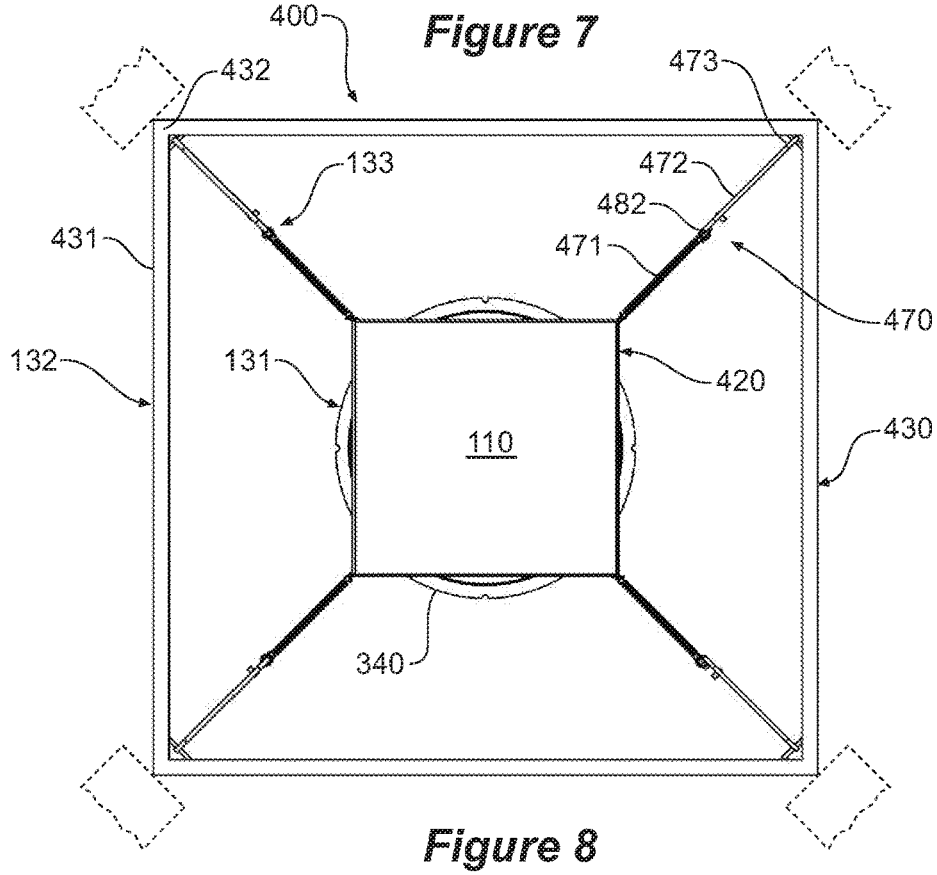
FIG. 8 is a top view of the drive system illustrated in FIG. 6.

Referring now to FIGS. 6 to 8, there are shown various views of a drive system 400 for a projection screen 110 according to another illustrative embodiment. In this example, first support component 420 for projection screen 110 is of an elevated box configuration formed from clear polycarbonate. In another embodiment, elevated first support component 420 may be formed from a wire frame of suitable rigid material such as aluminum rod or the like. Resonant mounting arrangement 133 in this embodiment is mounted to second support component 430 which forms an external frame that unlike the drive system depicted in FIGS. 3 to 5 remains stationary with respect to the projection screen 110 by being fixed externally 433. In this example, second support component 430 is shown as a square frame arrangement 431 which may in turn be attached to a housing of the volumetric 3D display if it has suitable rigidity (eg, see FIG. 23). In another example, the housing itself may form the second support component.

While the above embodiment has been described with respect to a square projection screen, it will be appreciated that a rectangular, circular, polygon or even non-regular shaped projection screen and support structure and corresponding support structures may be adopted depending on requirements. It will also be appreciated that while the projection screen is depicted as reciprocating in a vertical direction, the drive system may be oriented to any required direction as gravitational effects are minimal compared to the tension forces of the resonant mounting arrangement. As a non-limiting example, the present drive system may be implemented to drive a projection screen to reciprocate in a substantially horizontal direction.

Resonant mounting arrangement 133 in this embodiment includes four mounting members 470 each having a resilient portion 471 attached at one end to a corner of the first support component 420 and which is attached at the other end to a non-extendible or non-elastic portion 472 that in turn is pivotally mounted 473 to the external second support component 430. In this manner, non-extendible portion 472 functions to keep resilient portion 471 of mounting member 470 in tension by virtue of the rigidity of second support component 430.

Actuator arrangement 131 in this example is once again a subwoofer 340 but in this embodiment the actuator arrangement 131 does not drive the projection screen initially through the second support component 430 and then the resonant mounting arrangement 133, but instead directly drives the resonant mounting arrangement 133 which is comprised of the four mounting members 470. Accordingly, actuator arrangement 131 in this embodiment incorporates the open cylindrical base member 480 having a central aperture through which images are projected onto projection screen 110 by projector 120 and the four rigid struts 481. Each of struts 481 extend upwardly and is pivotally attached at connection points 482 to the end of non-extendible portion 472 of respective mounting members 470 of the resonant mounting arrangement 133.

In a similar manner to the driving of the second support component 330 by subwoofer 340 in the drive system described with reference to FIGS. 3 to 5, here the base member 480 moves with a reciprocal motion through an input excursion distance $d_2$ in accordance with the reciprocal motion of the cone of the subwoofer and this reciprocal motion is then transferred to the four mounting members 470 at the attachment point 482. This then causes the non-extendible portion 472 to travel through excursion distance $d_3$ and thereby drive the resilient portion 471 of mounting member 470, with this periodic oscillation then amplified by the resonant mounting arrangement to cause the projection screen 110 to reciprocate at the resonant frequency with an amplified excursion distance $d_1$ as described previously.

Due to the elevated first support component, the base plane of the swept volume display will be substantially at the same plane as the rest position of the four mounting members 470. As such, this embodiment may be employed where the swept volume of the 3D display extends above the drive system 400.

As would be appreciated, the weight of the portion being driven by the actuator is reduced in this embodiment as compared to the embodiment described with reference to FIGS. 3 and 4 as the second support component 430 does not form part of the arrangement being reciprocated. While the actuation arrangement of this embodiment bears some similarities to the second support component of the earlier embodiment it can be seen that in this embodiment there is no requirement for a frame member 331 of sufficient rigidity to which the mounting members are mounted to and which results in additional weight. Instead, this tensioning functionality is provided by the second support component 430 which in this embodiment does not form part of the assemblage being reciprocated.

In this example, non-extendible portion 472 is formed as a rigid member and, as would be appreciated, the location of the connection point 482 where the strut 481 connects to the non-extendible portion 472 may be varied. If the connection point 482 is moved outwardly away from resilient portion 471 then the end of non-extendible portion 472 attached to resilient portion 471 will be caused to travel through a greater vertical distance $d_3$ for a corresponding input excursion distance of the strut 481. However, a greater input force will be required from subwoofer 340 to drive this greater excursion.

In another embodiment, non-extendible portion 472 is formed of a flexible material of a length that is non-extendible. In this case, while the connection point 482 may be varied as described previously, as the non-extendible portion is not rigid there will not be an effective moment arm effect. In another embodiment, non-extendible portion 472 may be a cable tie as previously described whose length may be shortened to increase the tension in resilient portion 471. As with previously described embodiments, resilient portion 471 may be formed of any suitable arrangement that provides a restorative force dependent on the displacement of the arrangement from an equilibrium position.

Figure 9:
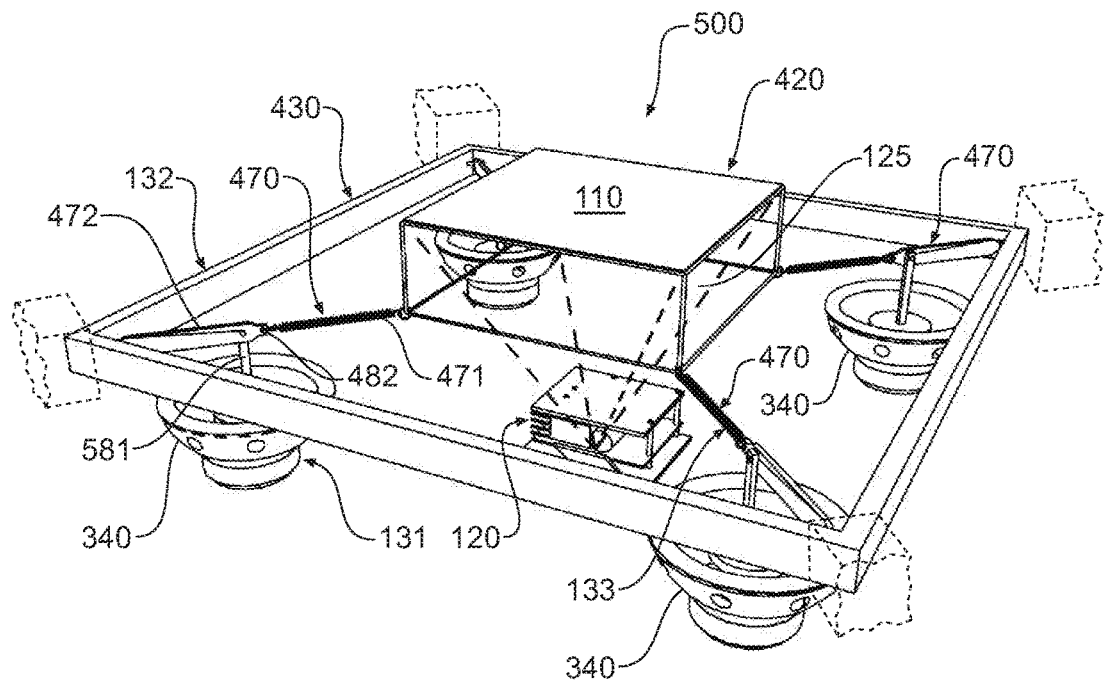
FIG. 9 is a perspective view of a drive system for a projection screen for a volumetric 3D display in accordance with a further illustrative embodiment.
Figure 10:
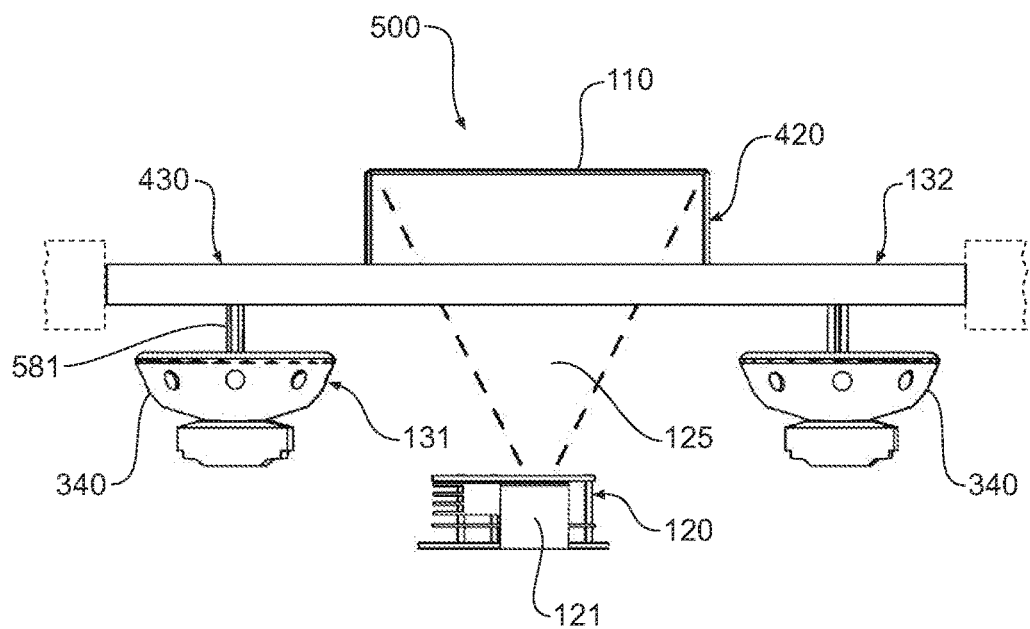
FIG. 10 is a side view of the drive system illustrated in FIG. 9.
Figure 11:
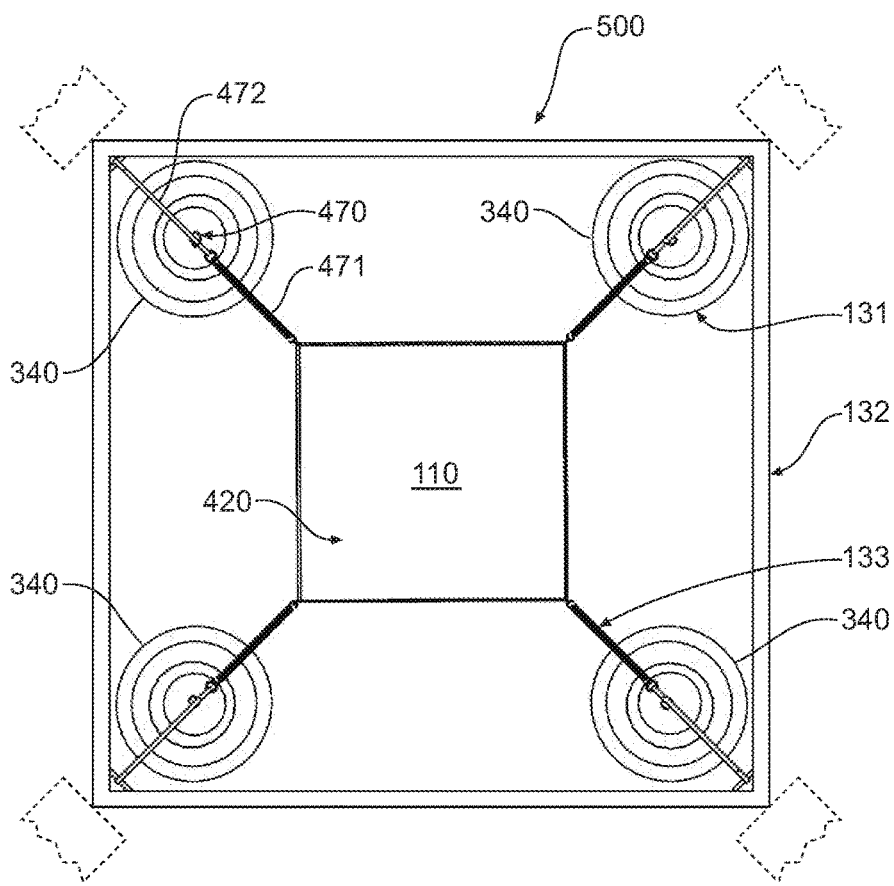
FIG. 11 is a top view of the drive system illustrated in FIG. 9.

Referring now to FIGS. 9 to 11 there are shown various views of a drive system 500 for a projection screen 110 according to another illustrative embodiment. This embodiment is similar to the embodiment described with respect to FIGS. 6 to 8 but instead of the actuator arrangement 131 being based on a single subwoofer, the present embodiment employs separate equivalent subwoofers 340 driving each mounting member 470 by vertical strut 581 connected to mounting member 470 at attachment point 482 as previously described. As would be appreciated, all subwoofers 340 are required to be driven substantially synchronously in order to achieve resonant movement of projection screen 110 as has been previously described. Drive system 500 allows for a flatter form factor and potentially larger projection screen 110 based on the increased power of using four equivalent subwoofers 340.

Figure 12:
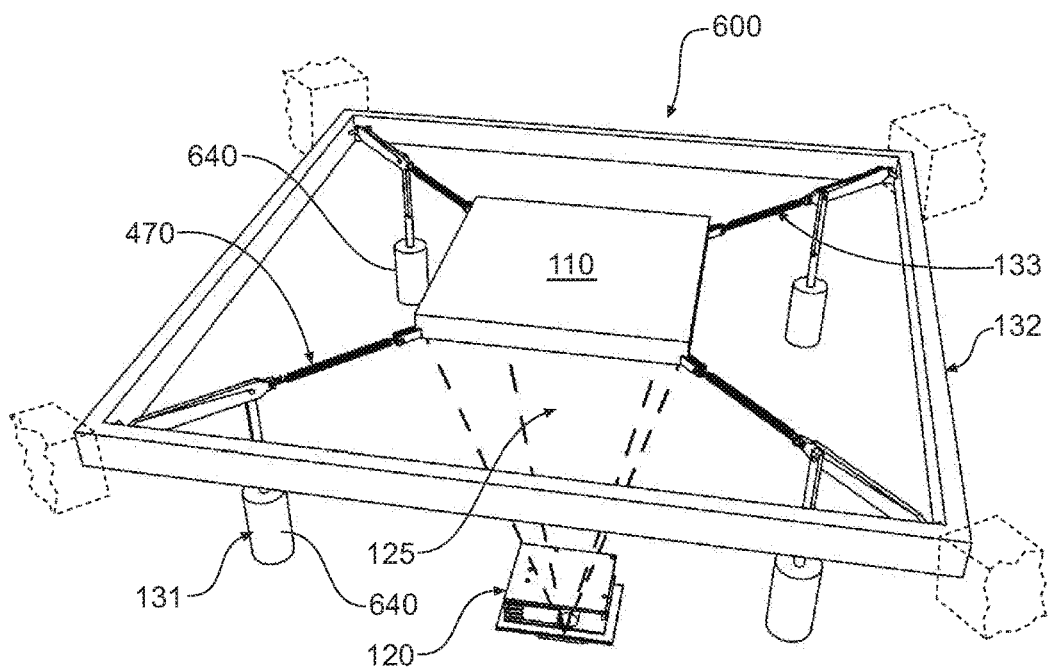
FIG. 12 is a perspective view of a drive system for a projection screen for a volumetric 3D display in accordance with another illustrative embodiment.
Figure 13:
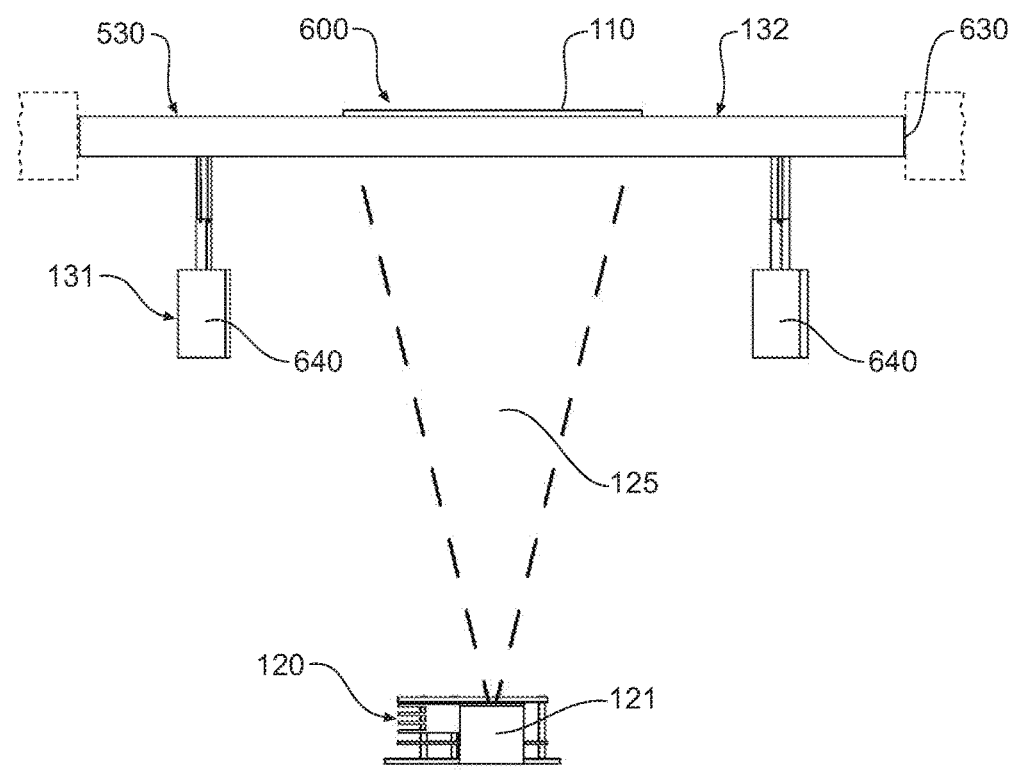
FIG. 13 is a side view of the drive system illustrated in FIG. 12.
Figure 14:
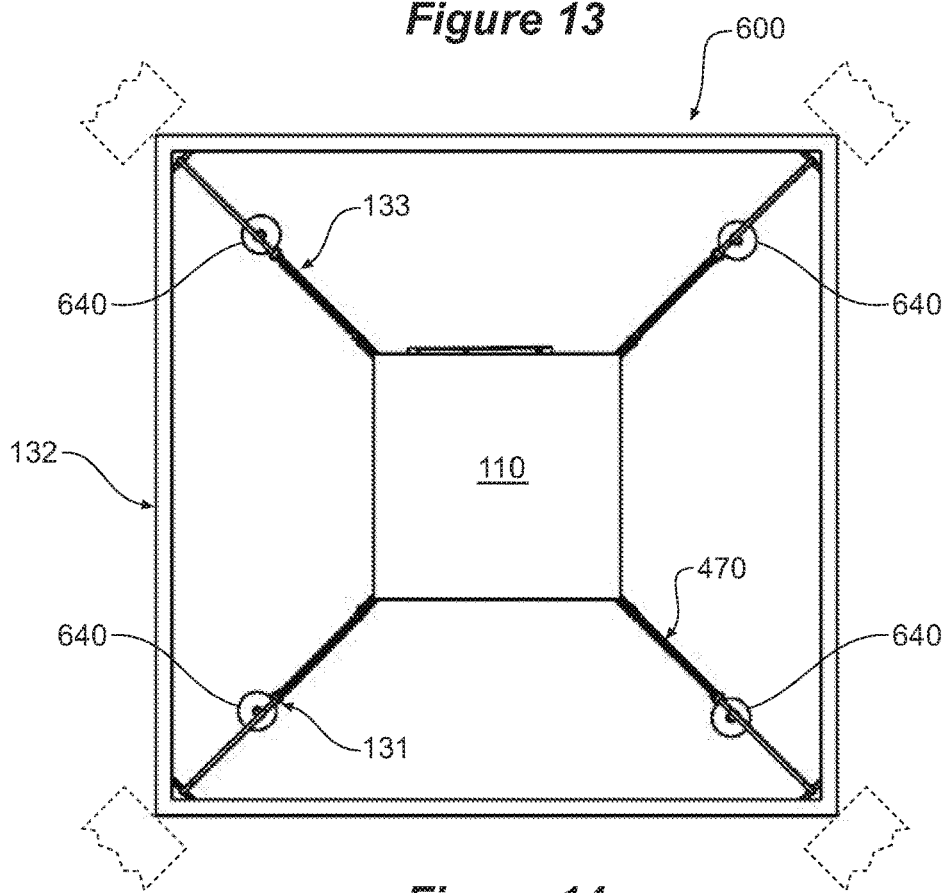
FIG. 14 is a top view of the drive system illustrated in FIG. 12.

Referring now to FIGS. 12 to 14, there are shown various views of a drive system 600 for a projection screen 110 according to another illustrative embodiment. This embodiment is similar to the embodiment described with respect to FIGS. 9 to 11 with the actuator arrangement 131 incorporating separate individual actuators but instead of using a subwoofer, an electromagnetic coil in the form of a bass shaker 640 is employed. A bass shaker is designed to be attached to an article such as a seat to transmit low frequency vibrations in accordance with an input electric signal. This tactile effect is often used to supplement an audio system to provide enhanced realism.

In this illustrative embodiment, a Quake™ Q10B™ or MQB-1™ MiniQuake™ bass shakers available from Earthquake Sound™ Corporation are employed. Bass shakers of this type are typically used when more power is required to move a larger mass projection screen 110. Other types of bass shakers that may employed include those disclosed in U.S. Pat. No. 7,449,803, to Sahyoun, and titled "Electromagnetic Motor to Create a Desired Low Frequency Vibration or to Cancel an Undesired Low Frequency Vibration", whose entire contents are incorporated here by reference.

Another type of actuator that may be employed depending on requirements is an electromagnetic linear actuator comprising a linear rate generator as disclosed in U.S. Pat. No. 3,024,374, to Stauder, and titled "Linear Rate Generator", whose entire contents are incorporated here by reference.

Figure 15:
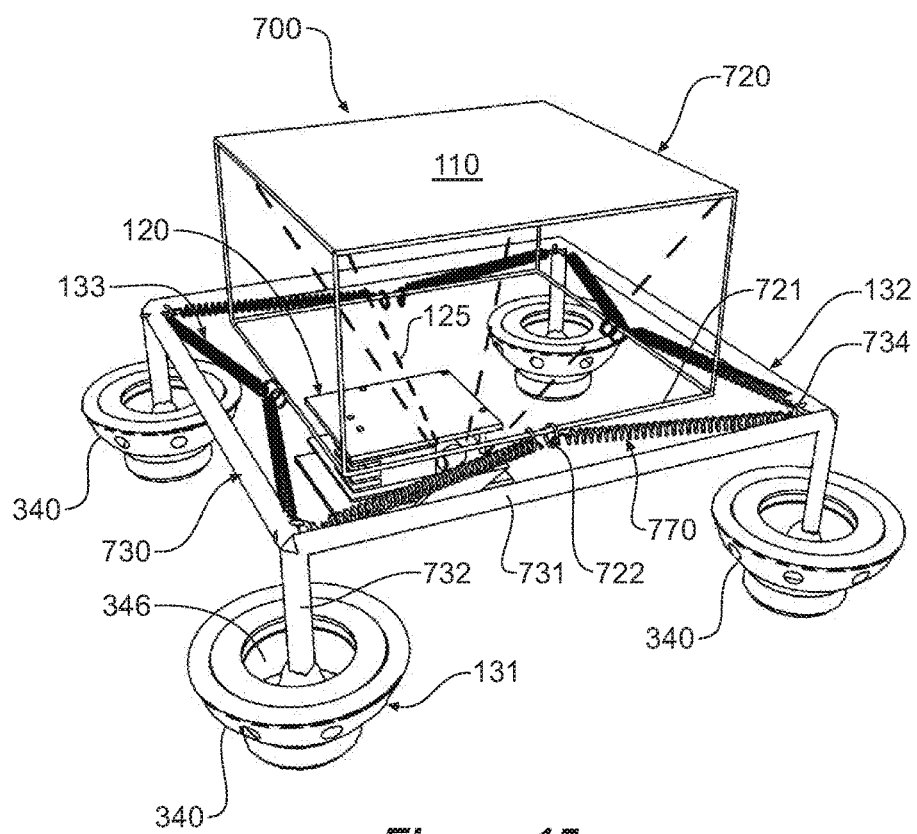
FIG. 15 is a perspective view of a drive system for a projection screen for a volumetric 3D display in accordance with yet another illustrative embodiment.
Figure 16:
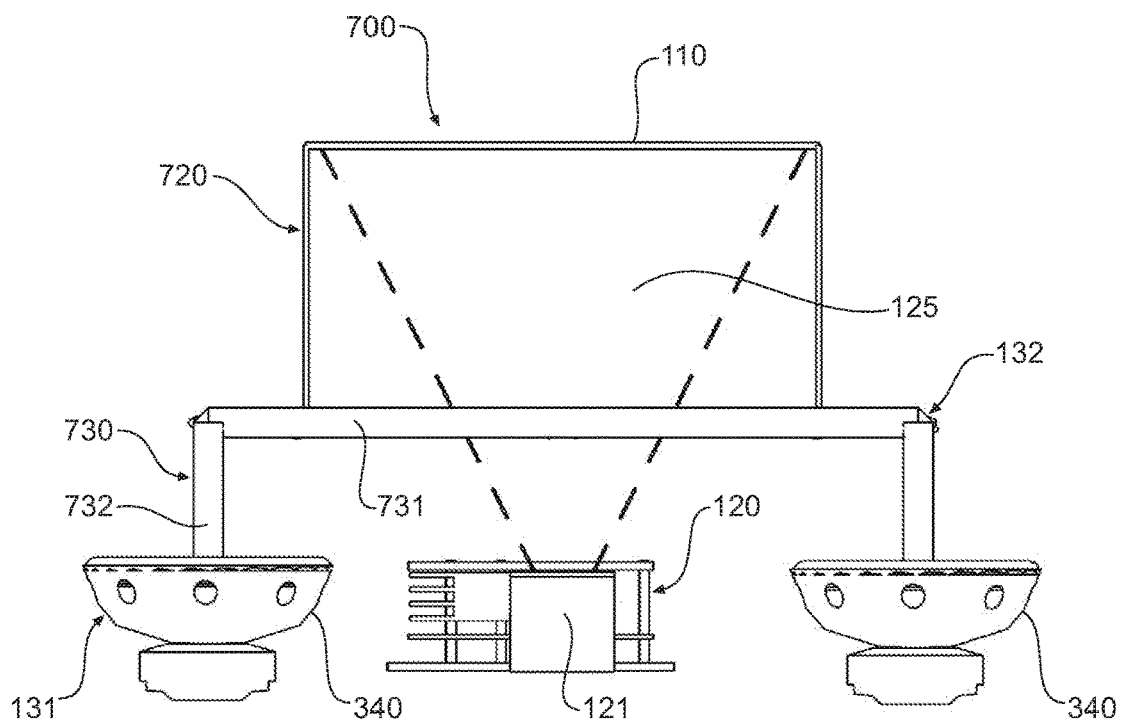
FIG. 16 is a side view of the drive system illustrated in FIG. 15.
Figure 17:
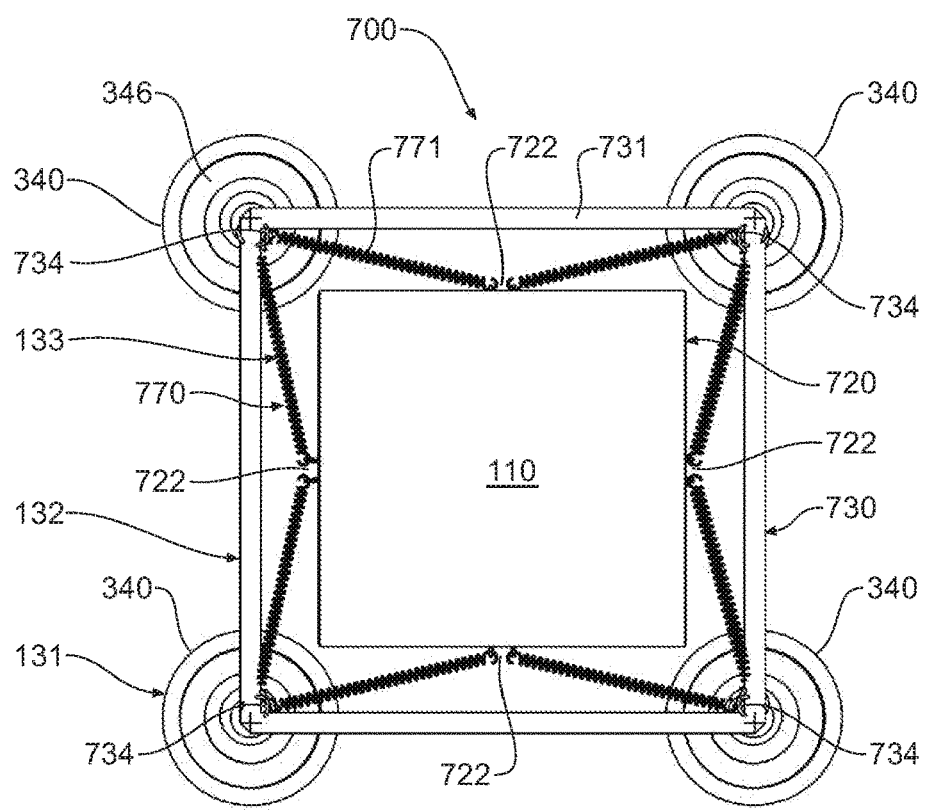
FIG. 17 is a top view of the drive system illustrated in FIG. 15.

Referring now to FIGS. 15 to 17, there are shown various views of a drive system 700 for a projection screen 110 according to another illustrative embodiment. This embodiment combines aspects of the embodiment described with reference to FIGS. 3 to 5 (eg entire support structure 132 is driven by actuator arrangement) with aspects of the embodiment described with reference to FIGS. 9 to 11 (eg actuator arrangement is comprised of multiple subwoofers 340).

In this embodiment, support structure 132 is again comprised of a first support component 720 and a second support component 730 configured as a surrounding square frame 731 having four legs 732 each mounted on the cone 346 of respective subwoofers 340. First support component 720 has a box type configuration providing an elevated platform for projection screen 110.

Resonant mounting arrangement 133 includes four pairs of resilient members 770 (as best seen in FIG. 17). Each pair of resilient members 770 are mounted to and extend from a corner portion 734 of surrounding square frame 731 and are attached respectively to the midpoint 722 of the lower edge 721 of the two sides of first support component 720 that are received within the respective corner portion 734. In this manner, the resilient members 770 extend a much shallower angle with respect to the projection screen 110 than the 45° angle of the previously described embodiments. This allows the size of the first support component 720 and hence the projection screen 110 to be increased for a given size of second support component 730. While in this embodiment, the pairs of resilient members 770 are attached to a bottom edge of an elevated first support component 720, in other embodiments the first support component 720 may have a substantially planar lid type configuration as has been previously described (eg, see FIGS. 12 to 14) and the resilient members than attached to the sides of the lid configuration. In yet another embodiment, the resilient members 770 need not each be necessarily attached to the midpoint 722 of the side of the first support component but may be spaced apart depending on requirements.

Figure 18:
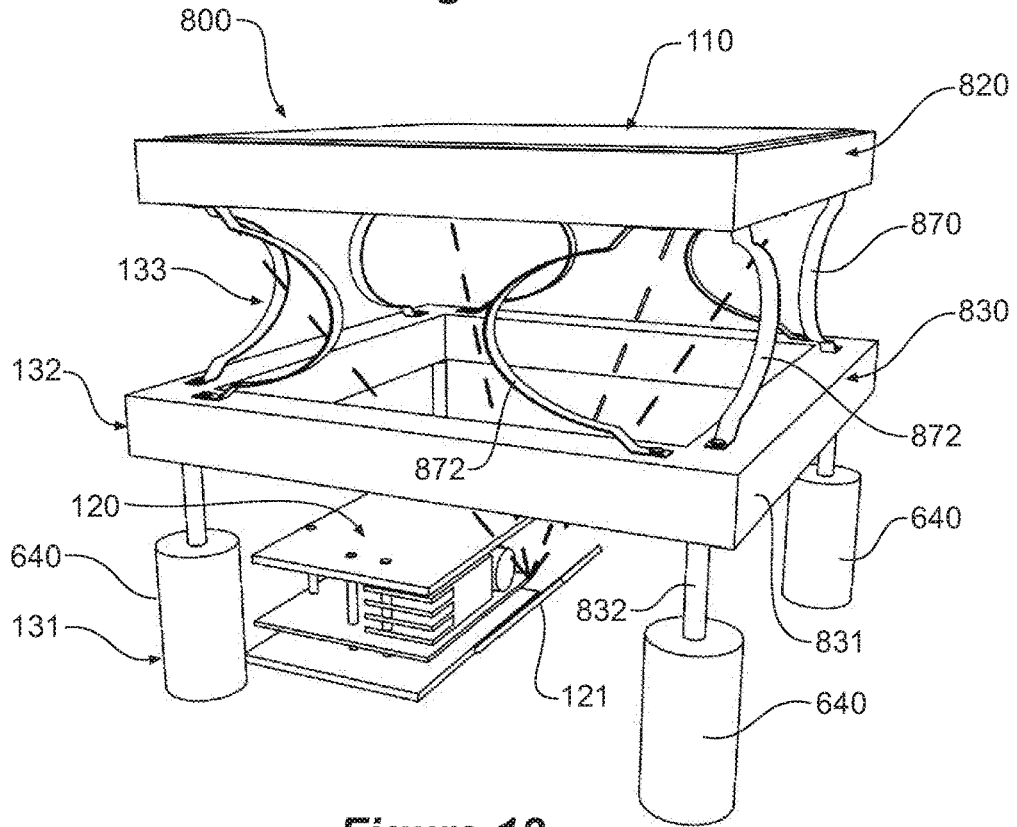
FIG. 18 is a perspective view of a drive system for a projection screen for a volumetric 3D display in accordance with a further illustrative embodiment.
Figure 19:
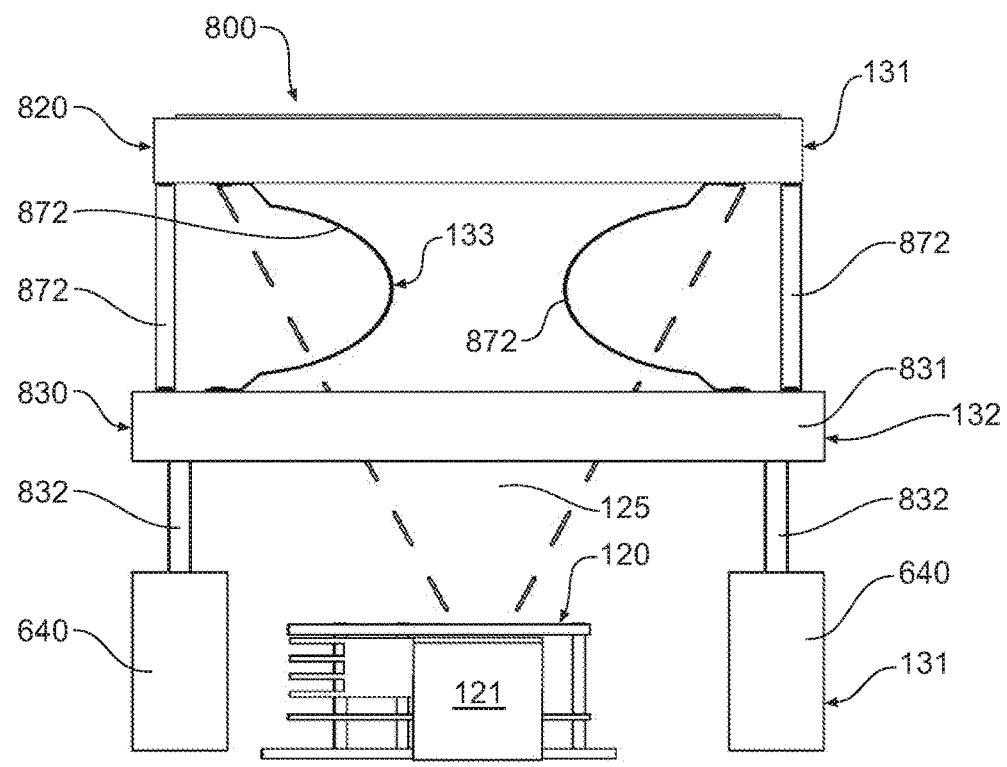
FIG. 19 is a side view of the drive system illustrated in FIG. 18.
Figure 20:
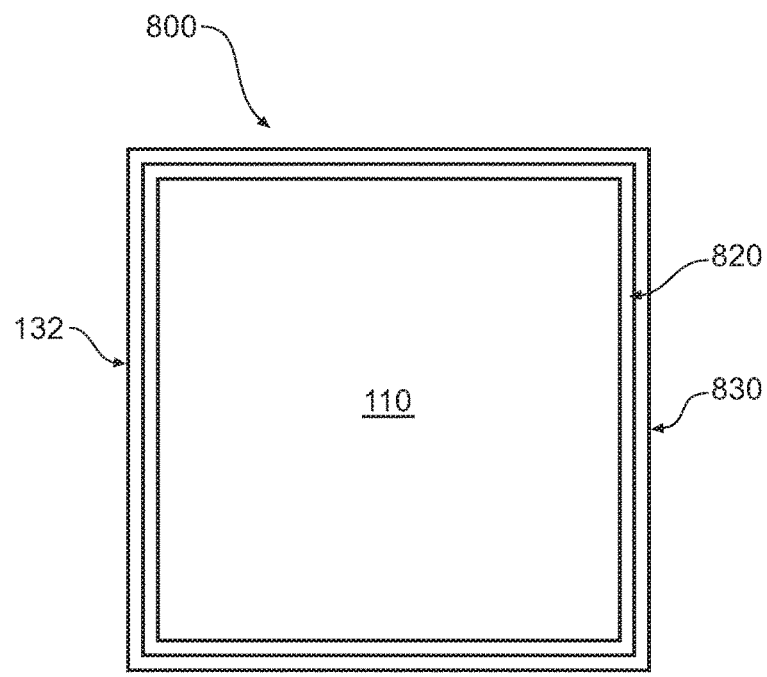
FIG. 20 is a top view of the drive system illustrated in FIG. 18.

Referring now to FIGS. 18 to 20, there are shown various views of a drive system 800 for a projection screen 110 according to another illustrative embodiment. In this embodiment, the first support component 820 is of a box type configuration and second support component 830 is of a similar sized open frame square configuration 831 having four legs 832 located at each corner and a central opening through which images are projected by projector 120 onto projection screen 110. Resonant mounting arrangement 133 in this embodiment is mounted to second support component 830 and includes a number of resilient members 870 which in this embodiment are in the form of compression springs consisting of individual leaf springs 872 formed of spring steel or other material of high tensile strength which extend upwardly in pairs from the corner regions of the second support component 830 to attach to respective corner regions of the first support component 820. As would be appreciated, resilient members 870 in this embodiment function exclusively in the vertical direction unlike the resilient members of the earlier embodiments which would include both a horizontal and vertical component to their restorative force.

Actuator arrangement 131 in this embodiment is comprised of four bass shakers 640 but depending on requirements subwoofers may be employed depending on factors including, but not limited to, the mass and size of the projection screen and any associated support arrangement. In other embodiments, suitable electromagnetic coil based actuators such as previously described may be employed.

As would be appreciated, drive system 800 by virtue of its "stacked" or vertical formation (in this example) has a reduced form factor in terms of its lateral extent for a given size of projection screen 110 as the screen size may be essentially the same size as any enclosure. A further advantage of this configuration is that the number of bearings and similar moving parts are reduced, assisting in improving reliability. As there are no parts moving against other parts, there is no friction resulting in much reduced wear and associated noise of operation.

As would be further appreciated, the actuator arrangement need not provide a reciprocating force at an input reciprocating frequency that exactly matches the screen reciprocating frequency nor does the screen reciprocating frequency need to exactly match the resonant frequency of the resonant mounting arrangement as the mechanical system described in the embodiments above is capable of tolerating differences between these frequencies. In one example, this tolerance is of the order of 1% of the screen reciprocating frequency. In another example, the tolerance is of the order of 2%.

Figure 21:
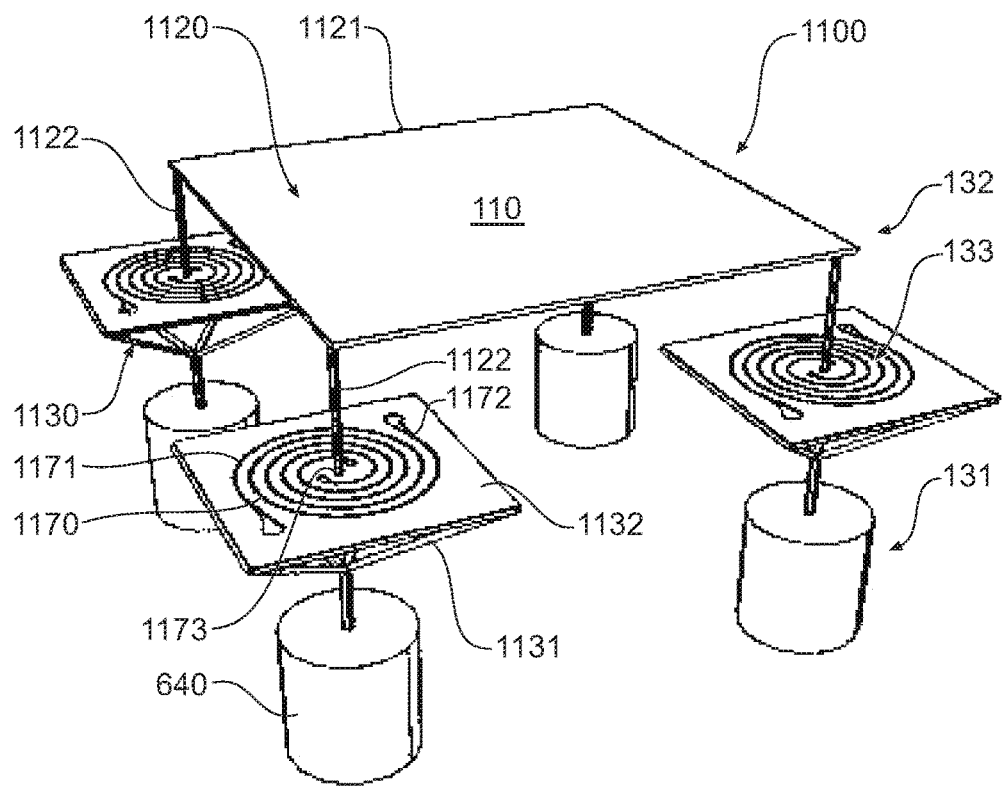
FIG. 21 is a perspective view of a drive system for a projection screen for a volumetric 3D display in accordance with yet another illustrative embodiment.
Figure 22:
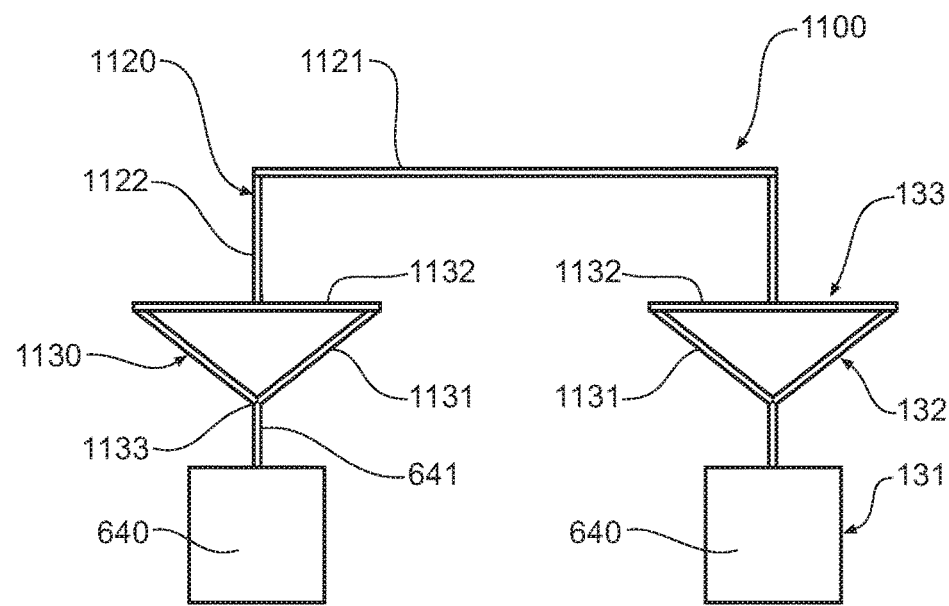
FIG. 22 is a side view of the drive system illustrated in FIG. 21.

Referring now to FIGS. 21 to 22, there are shown various views of a drive system 1100 for a projection screen 110 according to another illustrative embodiment. In this embodiment, support structure 132 includes a first support component 1120 having a square profile for supporting screen 110 further including four legs or struts 1122 extending downwardly from each corner of the projection screen 110 forming a table configuration. Support structure 132 further includes a second support component 1130 consisting of an inverted pyramid frame arrangement 1131 connected to the actuator arrangement 131 which in this embodiment comprises four bass shakers 640 by respective vertically extending drive rods 641 which connect at a lower end to bass shaker 640 and then attach to the apex 1133 of the inverted pyramid frame arrangement 1131.

The base region of each inverted pyramid frame arrangement 1131 corresponding to each shaker 640 provides a planar platform 1132 to mount the resonant mounting arrangement 133 consisting of in this embodiment four planar spiral spring arrangements 1170 to which the legs 1122 of the first support component 1120 are attached to. Although bass shakers 640 are employed in this embodiment it would be appreciated that other linear actuators such as subwoofers and the like may be used depending on requirements.

Planar spiral spring arrangements 1170 may be comprised of one or more spirals cut from a suitable resilient material such as acetyl or steel. In this particular embodiment, each spring is composed of two spirals 1171, 1172 which are connected to the spring housing 180 degrees out of rotational phase from each other on the horizontal plane of platform 1132. In its resting state, each spiral spring arrangement 1170 is substantially co-planar with platform 1132, but when each frame arrangement 1131 is vibrated at a rate which matches the resonant frequency of drive system 1100 by bass shaker 640, the central region 1173 of the spring flexes upwards and downwards. As the central region 1173 of the spring arrangement 1170 is supported from opposing sides, the connection point of the leg stays substantially level and so the imparted motion is restricted to reciprocating vertical movement with respect to an equilibrium point at the horizontal plane of platform 1132.

The resonant frequency of spring arrangement 1170 can easily be modified by either increasing or decreasing the number of turns of the one or more spirals and/or by varying the thickness and composition of the spring material.

Figure 23:
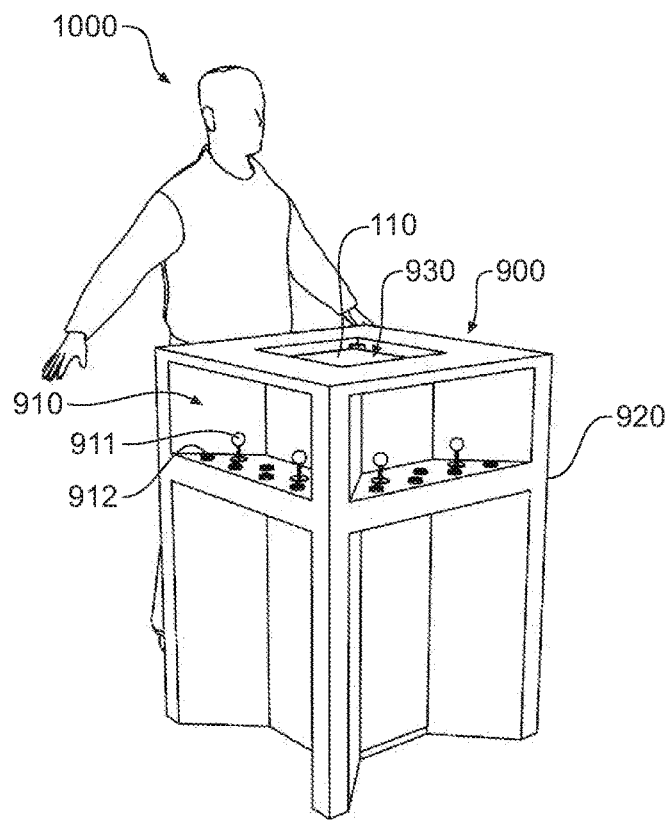
FIG. 23 is a perspective view of a gaming console based on a volumetric 3D display in accordance with an illustrative embodiment.
Figure 24:
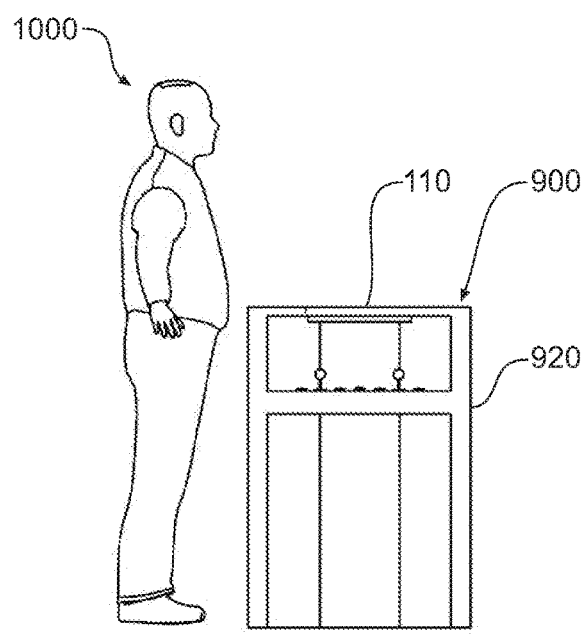
FIG. 24 is a side view of the gaming console illustrated in FIG. 23.

Referring now to FIGS. 23 and 24, there are shown perspective view and side views of a gaming console 900 according to an illustrative embodiment based on a volumetric 3D display incorporating a drive system for the projection screen as previously described Gaming console 900 includes a general box shaped enclosure or housing 920 including four individual gaming stations 910 arranged across from each other, each station 910 incorporating corresponding gaming inputs in the form of joysticks 911 and buttons 912. The gaming console 900 forms an enclosure and in this embodiment, the swept volume 930 is below the top surface of the console 900 and a game player 1000 looks over and into the 3D display.

In other embodiments, where the first support component includes an elevated or raised platform for projection screen 110 that extends upwardly from the top surface of console 900, the swept volume and hence 3D display will project above console 900. As has been discussed previously, the enclosure by virtue of its rigidity may form the second support component for those embodiments where the second support component is static with respect to the actuation arrangement such as those embodiments described with reference to FIGS. 6 to 8, 9 to 11 and 12 to 14.

Where the second support component is driven by the actuator arrangement such as those embodiments described with reference to FIGS. 3 to 5, 15 to 17 and 18 to 20, guide or stabilizing springs from the second support component may be attached to the enclosure for stability purposes without contributing to the resonant behavior of the resonant mounting arrangement.

In other example uses, a volumetric 3D display incorporating a drive system for a projection screen as previously described may be implemented in video conferencing systems, medical imaging systems or in any application where the ability to view a 3D representation is of assistance.

A drive system in accordance with the above described embodiments provides a number of substantial improvements. The use of a resonance mounting arrangement allows for an actuator arrangement that has a minimal excursion distance to be amplified substantially reducing the requirement for directly driving the projection screen over the full excursion distance as in prior art direct drive systems. This substantially reduces the number of moving parts and increases the reliability of the drive system. In addition, by driving the projection screen at the resonant frequency of the resonant mounting arrangement this ensures a much more stable reciprocation frequency once resonance has been achieved. This improves the quality of the 3D image and reduces the requirement for sophisticated control and monitoring systems which must in real time determine the position of the projection screen.

It follows that a volumetric 3D display incorporating a drive system based on the above embodiments is capable of providing a larger projection screen that operates at higher frequencies and with larger excursion distances than current systems based on "direct" drive or similar approaches which rely on direct actuation of the projection screen.

While the above described embodiments have been described in the context of a drive system for a volumetric 3D display, it will be appreciated that the above drive system may have other applications including, but not limited to, industrial shakers and mixers or launch platforms. While the typical reciprocation frequency of the above described embodiments is at or about 20 Hz in other embodiments, the reciprocation frequency may be in the range, including but not limited to: less than 8 Hz, 8-10 Hz, 10-12 Hz, 12-14 Hz, 14-16 Hz, 16-18 Hz, 18-20 Hz, 20-22 Hz, 22-24 Hz, 24- 26 Hz, 26-28 Hz, 28-30 Hz or greater than 30 Hz.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the disclosure is not restricted in its use to the particular application described. Neither is the present disclosure restricted in its preferred embodiment with regard to the particular elements and/or features described or depicted herein. It will be appreciated that the disclosure is not limited to the embodiment or embodiments disclosed, but is capable of numerous rearrangements, modifications and substitutions without departing from the scope of the invention as set forth and defined by the following claims.

The invention claimed is:

1. A drive system for a projection screen in a swept surface volumetric three dimensional (3D) display, the drive system operable to cause the projection screen to reciprocate through an excursion distance, at a screen reciprocating frequency, relative to a projection system, the drive system including:
    an actuator arrangement for generating an input reciprocating force substantially at the screen reciprocating frequency through an input excursion distance; and
    a support structure for the projection screen, the support structure including a resonant mounting arrangement for the projection screen, the resonant mounting arrangement operably connected to the actuator arrangement and configured to allow the projection screen to reciprocate through the excursion distance, wherein the resonant mounting arrangement is configured to have a resonant frequency substantially equivalent to the screen reciprocating frequency on actuation of the actuator arrangement.

2. The drive system of claim 1, wherein the support structure for the projection screen includes a first support component for supporting the projection screen and a second support component to mount the resonant mounting arrangement to for attachment to the first support component.

3. The drive system of claim 2, wherein the second support component is directly connected to the actuator arrangement to in turn drive the resonant mounting arrangement to drive the first support component and the projection screen to reciprocate at the screen reciprocating frequency.

4. The drive system of claim 3, where the actuator arrangement includes a single actuator and wherein the second support component is connected to the single actuator.

5. The drive system of claim 3, wherein the actuator arrangement includes multiple actuators and wherein the second support component is connected to the multiple actuators.

6. The drive system of claim 2, wherein the second support component includes a frame member that substantially surrounds the first support component, and wherein the resonant support arrangement includes one or more resilient members mounted to and extending from the frame member and attached to the first support component.

7. The drive system of claim 2, wherein the first and second support components are in a stacked configuration, and wherein the resonant support arrangement includes one or more resilient members mounted to and extending from the second support component and attached to the first support component.

8. The drive system of claim 2, wherein the second support component is stationary with respect to the actuator arrangement and the actuator arrangement directly drives the resonant mounting arrangement to drive the first support component and the projection screen to reciprocate at the screen reciprocating frequency.

9. The drive system of claim 8, wherein the second support component includes a frame member that substantially surrounds the first support component, and wherein the resonant mounting arrangement includes one or more mounting members mounted to and extending from the frame member and attached to the first support component.

10. The drive system of claim 9, wherein the one or more mounting members include a resilient portion.

11. The drive system of claim 10, wherein the one or more mounting members further includes a non-extendible portion, and wherein the actuator arrangement directly drives the non-extendible portion with respect to the second support component to in turn drive the resilient portion.

12. The drive system of claim 9, wherein the actuator arrangement includes a plurality of actuators each driving a respective mounting member.

13. The drive system of claim 1, wherein a magnification factor defined by a ratio of the excursion distance of the projection screen to the input excursion distance of the actuator arrangement is greater than or equal to 10.

14. The drive system of claim 13, wherein the magnification factor is greater than or equal to 15.

15. The drive system of claim 13, wherein the magnification factor is greater than or equal to 20.

16. The drive system of claim 1, wherein the reciprocation frequency of the projection screen is about 20 Hz.

17. The drive system of claim 1, wherein the resonant mounting arrangement is tunable to vary the resonance frequency.

18. The drive system of claim 1, wherein the actuator arrangement is based on one or more linear actuators.

19. The drive system of claim 1, wherein the one or more linear actuators are one or more electromagnetic coils.

20. The drive system of claim 19, wherein the one or more electromagnetic coils are subwoofers.

21. The drive system of claim 19, wherein the one or more electromagnetic coils are bass shakers.

22. A gaming console incorporating the swept surface volumetric 3D display of claim 21.

23. A swept surface volumetric 3D display incorporating a drive system according to claim 1.

* * * * *